INVENTOR
Joseph Fenwick Jackson
By
Pierce, Scheffler & Parker
Attorneys

United States Patent Office 3,462,667
Patented Aug. 19, 1969

3,462,667
SIX-PHASE ELECTRIC STEPPING MOTOR
WITH CONTROL SYSTEM INCLUDING
LOGIC CIRCUITRY
Joseph F. Jackson, Halifax, England, assignor to Pratt
Precision Hydraulics Limited, Halifax, England, a
British company
Filed Feb. 21, 1968, Ser. No. 707,167
Claims priority, application Great Britain, Mar. 2, 1967,
9,972/67
Int. Cl. H02p 1/02, 7/06
U.S. Cl. 318—138                                    7 Claims

ABSTRACT OF THE DISCLOSURE

A system including logic circuitry for converting electrical control signals in digital form into discrete stepped angular motion in which a six phase electrical stepping motor is used, three output signals are derived from the electrical control signals, the three output signals are used to drive three of the six phases of the motor, and the complements of the three output signals are used to drive the other three of the six phases of the motor.

---

This invention relates to electrical stepping motor systems, that is to say systems for converting electrical control signals in digital form into discrete stepping angular motion.

It is an object of the present invention to provide an electrical stepping motor system which is capable of operation at higher stepping frequencies than any previously known system, and yet which is more compact and less complex in its circuitry than the previously known systems which have given the highest stepping frequencies previously available.

Electrical stepping motor systems have applications in a number of fields, one of which is the numerical position control of machine tools. In all applications, however, the electrical stepping motor serves in effect as a digital to analogue converter in which electrical input information supplied in pulsed form is converted to a discontinuous analogue output shaft position.

The electrical control signals in digital form which are applied to the electrical stepping motor drive system comprise a series of input command pulses, each of which represents one step of desired angular motion, and a directional control signal which may be either one of two conditions, for example presence or absence, and which controls the direction of rotation of the electrical stepping motor. The speed of the stepping motor is determined by the frequency of the applied pulsed input and the angle of rotation of the motor output shaft corresponds to the number of pulses received. In the event of a pulse not being present, the output shaft of the motor is held stationary by an electromagnetic field or by some mechanical detenting arrangement.

One known electrical stepping motor is a three phase motor, that is to say the motor comprises a rotor which has a certain number ($n$) of poles and three stators each having the same number ($n$) of poles. The three stators are angularly displaced with respect to each other so that there is a stator pole for each one third of a rotor pole pitch. The motor is operated by sequential energisation of the three phases which are provided by the three separate stators, and the motor is reversed by changing the sequence in which the phases are energised. The sequential energisation of the individual phases is effected by an electronic asynchronous logic circuit which is known as a translator circuit.

Electrical stepping motors are subject to a number of limitations, of which the maximum stepping frequency to which the motor will respond is the most serious in a majority of the applications to which the motor may be put. The maximum stepping frequency of the motor may be increased by increasing the number of phases, and it is known that a five phase electrical stepping motor has been manufactured. However, the increase in the number of phases in the electrical stepping motor brings a consequential increase in the complexity of the translator circuit which is necessary to drive the motor. As an indication of the increase in the complexity of the translator circuitry as the number of phases in the electrical stepping motor is increased, it has been found that, as compared with the translator circuit used to drive a three phase electrical stepping motor, by deriving three output stepping motor calls for a translator circuit, the logic elements of which are increased in number by at least 50%.

It has seemed that increase in the number of phases of the electrical stepping motor must lead inevitably to an increase in the complexity of the translator circuitry, but the present applicant has now devised an electrical stepping motor system which is capable of higher stepping frequencies than any similar system previously proposed, and which involves the use of a translator circuit which is less complex than the translator circuits used for the five phase electrical stepping motors previously manufactured.

In accordance with the present invention the applicant achieves these substantial advantages in a system for converting electrical control signals in digital form into discrete stepped angular motion by using a six phase electrical stepping motor, by deriving three output signals from the electrical control signals and by using these three output signals to drive three of the phases of the motor and the complements or inversion of these three output signals to drive the other three phases of the motor.

In fact the applicant's advance in the field of electrical stepping motor drive systems is based on the inventive concept that a selection of six for the increased number of phases of the electrical stepping motor enables three phased output signals to be effectively doubled up to drive the six phases of the electrical stepping motor by using the complements of the three phased outputs as well as the outputs themselves. The translator circuit which is used in accordance with the present invention to derive the three phased output signals may be said to be in essence a three phase translator circuit, but in this context the term "three phase translator circuit" is used to denote a translator circuit specifically designed for driving a three phase electrical stepping motor. The concept of the present invention enables a three phase translator circuit to be used, either without any addition or modification or with only the addition of a comparatively small number of further circuit elements, to drive a six phase electrical stepping motor which is inherently capable of very much higher stepping frequencies than any electrical stepping motor known or available hitherto.

Whether a particular three phase translator circuit may be used directly to drive a six phase electrical stepping motor or whether the three phase translator circuit requires some modification or addition of components will depend upon the sequence in which the three phases of the electrical stepping motor for which the translator circuit was designed were energised by the three phase translator circuit.

The energising or driving sequence employed to drive any electrical stepping motor may be expressed in terms of the number of coils which are energised at each stage of the sequence, that is to say at each time at which the rotor of the electrical stepping motor is at rest. For example the operation of a three phase electrical stepping motor which is described by the sequence 2, 1, 2, 1, 2 is one in which the rest positions of the rotor are determined alternately by two energised phases and one energised phase. Therefore, if the three phases of the motor are A, B and C, the phases which are energised at the first rest position may be A and B so that the rotor is at rest midway between the positions of the phases A and B. If A is then de-energised, the rotor will move to a position opposite phase B and this is the second rest position. The third rest position is achieved by energising phase C so that the rotor is brought to a position midway between the positions of the phases B and C, and so on. In accordance with this invention, a three phase translator circuit designed for this mode of operation of a three phase electrical stepping motor may be used directly, without any modification and without the addition to the translator circuit of any extra elements, to drive a six phase electrical stepping motor.

Another sequence in which a three phase electrical stepping motor may be energised is the 2, 2, 2, 2 sequence. According to this mode of operation two of the phases of the three phase electrical stepping motor are always energised, successive rest positions being determined by AB, BC, CA, etc. A three phase translator circuit designed for this mode of operation of a three phase electrical stepping motor could be used without any modification to drive a six phase electrical stepping motor, but it would move the rotor of the six phase electrical stepping motor through twice the step angle which is intended. The full advantages of using a six phase electrical stepping motor would not therefore be realised when this three phase translator circuit was used, because the circuit would effectively be driving the six phase electrical stepping motor as a three phase electrical stepping motor. However, the performance would be better than when the circuit was used with a three phase electrical stepping motor, because the torque which is developed to move the rotor of the six phase electrical stepping motor is twice the torque developed in a three phase electrical stepping motor driven by the same translator circuit.

A third mode of operation of a three phase electrical stepping motor is one which is intermediate to the two already mentioned, and the energising sequence of this mode of operation may be represented by 2, (1), 2 (1), 2, etc. The rest position of each phase of the motor is still determined by the energisation of two phases, but there is an intermediate stage in which only one stage is energised and this intermediate stage exists for the duration of the input pulse only. There are certain advantages in this mode of operating a three phase electrical stepping motor, as compared with the 2, 1, 2, 1, 2 mode in which the rotor tends to overshoot the 1 position and oscillate about that position before coming to rest. When the 1 position is only an intermediate stage, the rotor may be permitted to overshoot the 1 position and then be drawn to rest in the next 2 position by a correct selection of the time at which the next phase is energised.

A three phase translator circuit designed for this third mode of operation of a three phase electrical stepping motor may be used in accordance with the present invention to drive a six phase electrical stepping motor solely by the addition of a simple binary trigger circuit in order to divide the input pulse train by two before the pulses are fed into the three phase translator circuit. The particular system in accordance with the present invention which will be described and illustrated herein is a system of this kind.

The design of a translator circuit which will provide three output signals and their complements is a comparatively simple matter for the electronics engineer who is fully acquainted with the various logic elements which are available and the techniques and formulae for circuit design using the available components to do a specific job. Consequently it is not essential for the translator circuit which is used to drive the six phase electrical stepping motor in accordance with this invention to have been designed originally for the specific purpose of driving a three phase electrical stepping motor. A translator circuit which has been designed for driving a six phase electrical stepping motor will be capable, by appropriate selection of three of the six outputs, of driving a three phase electrical stepping motor, if it is desired to use the translator circuit for this purpose.

From the above discussion it will have been understood that, in accordance with the present invention, the applicant provides a system for converting electrical signals in digital form into discrete stepped angular motion by using a six phase electrical stepping motor and by using the outputs and the complements of the outputs of a three phase translator circuit which is capable of driving a three phase electrical stepping motor in a 2, 1, 2, 1, 2 or a 2, (1), 2, (1), 2 mode of operation to drive respectively the six phases of the electrical stepping motor. In the former case no modification of the three phase translator circuit is necessary for driving a six phase electrical stepping motor, and the series of input command pulses are applied directly to the three phase translator circuit. In the latter case it is necessary to derive a series of pulses having a frequency equal to half the frequency of the series of input command pulses by using, for example, a binary trigger circuit, and it is this derived series of pulses which is fed to the three phase translator circuit when this is used to drive the six phase electrical stepping motor.

When the three phase translator circuit is of the kind to drive a three phase electrical stepping motor which operates in the energising sequence 2, (1), 2, (1), 2 then, in order to be completely satisfactory for driving a six phase electrical stepping motor, the three phase translator circuit must be capable of having the sequence of energisation of its outputs changed at any time independently of the presence or absence of a pulse in the signal obtained from the binary trigger circuit.

In accordance with the present invention three phases of the six phase electrical stepping motor are always energised, and, when one of the three energised phases is de-energised another phase is simultaneously energised, the newly energised phase being the complement of the phase which has been de-energised.

Broadly in accordance with this aspect of the present invention there is provided a system for converting electrical control signals in digital form into discrete stepped angular motion in which a series of pulses, each of which represents one step of desired angular motion, is fed together with a directional control signal to a three phase translator circuit, the outputs and the complements of the outputs of the three phase translator circuit are connected through respective current amplifiers to the coils of a six phase electrical stepping motor, three angularly adjacent phases of the electrical stepping motor being energised in any one operating condition of the three phase translator circuit, and a receipt of a pulse by the translator circuit causing the translator circuit to change its operating condition so that a phase angularly succeeding one end phase of the three energised phases becomes energised and simultaneously the phase which was the phase at the opposite end of the three energised phases becomes de-energised so that a new series of three angularly adjacent phases is energised, the end of the three energised phases at which energisation of the next phase occurs depending on the directional control signal.

There is a further advantage which is obtainable as a result of the inventive selection of six phases for the electrical stepping motor, and this is in conjunction with the forcing resistors which are provided in the energised circuits for each phase of the motor. The provision of a forcing resistor is conventional in existing electrical stepping motors, and is necessary, because, in order to achieve high stepping speeds, the current through the particular coil representing one phase of the electrical stepping motor must obtain its maximum value in as short a time as reasonably practicable. Because the time constant of the energised circuit is dependent on the inductance and resistance of the coil or winding of the motor, the forcing resistor, which may be as much as ten times greater in value than the resistance of the coil itself, is included. A high power resistor of this kind is a bulky item and is expensive in comparison with most of the other circuit elements and particularly the other resistors used in the electrical circuitry of the system. It has hitherto always been necessary to provide one forcing resistor for each phase of the electrical stepping motor.

However, the selection of six phases for the electrical stepping motor and the energisation of the six phases by three outputs and the complements of the three outputs enables the phases of the electrical stepping motor which are energised, respectively by an output and the complement of that output, and which are therefore never energised simultaneously, to be arranged in parallel and the parallel circuit to be connected in series with the forcing resistor. In accordance with this feature, therefore, the circuits for phases energised by an output of the translator circuit and the complement of that output share a forcing resistor, and consequently only three such resistors are required in the system.

In the particular embodiment of the invention which will be described, the outputs and the complements of the outputs of the translator circuit are applied to the bases of respective amplifying transistors, each of which is connected in series with a corresponding coil of the six phase electrical stepping motor. The parallel circuit which is connected in series with the single forcing resistor is therefore a parallel circuit comprising in each arm a transistor and a coil or winding of the electrical stepping motor, the transistors in the arms of each parallel circuit being the amplifying transistors for an output and the complement of that output.

In order that the invention may be better understood the following detailed description is made with reference to the accompanying drawings, in which.

In the drawings the same or similar parts are designated by like reference numerals.

Figure 1:
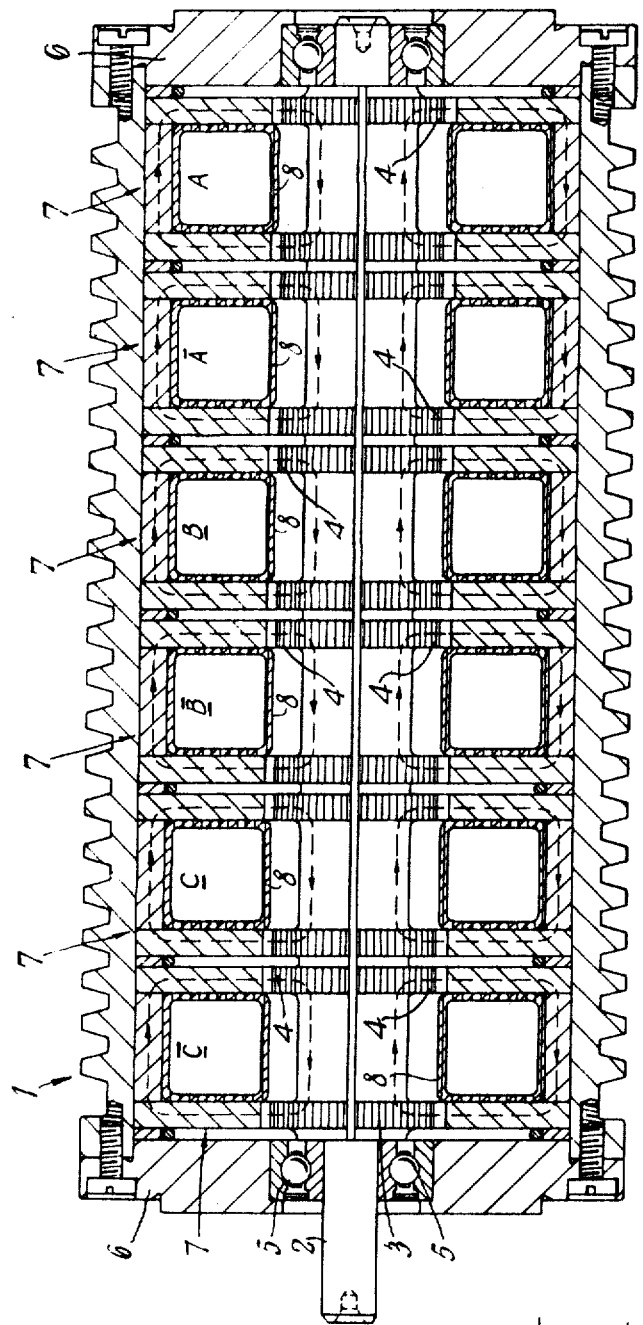
FIGURE 1 is a cross-sectional view of a six phase electrical stepping motor, the section being taken along the axis of rotation of the motor.
Figure 2:
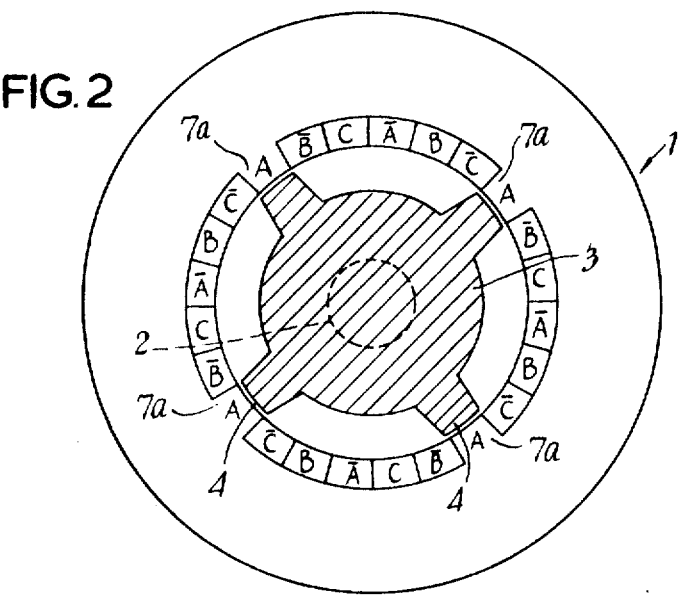
FIGURE 2 illustrates diagrammatically one arrangement of the six phases of the six phase electrical stepping motor of FIGURE 1.

Referring to FIGURES 1 and 2, a six phase electrical stepping motor is denoted generally by the reference numeral 1. The motor 1 has an output shaft 2 carrying a rotor 3 which has two pairs of poles 4 (as shown diagrammatically in FIGURE 2), the rotor 3 being free to rotate in rolling bearings 5 about the axis of the output shaft 2. Mounted within a housing 6 of the electrical stepping motor 1 are six axially spaced stator assemblies 7, each of which has its own individual coil or winding 8 which forms one of the six phases denoted respectively by the references A, $\bar{A}$, B, $\bar{B}$, C, $\bar{C}$, for reasons which will become apparent. In FIGURES 1 and 2 the six coils 8 are concentric with the rotor 3 and when energised set up the magnetic flux paths shown in FIGURE 1. Each stator assembly 7 has two pairs of poles 7a, shown diagrammatically in FIGURE 2, and the windings of the individual stator assemblies A, $\bar{A}$, B, $\bar{B}$, C, $\bar{C}$ are phase-shifted spacially by one sixth of a pole pitch in the order A, $\bar{B}$, C, $\bar{A}$, B, $\bar{C}$, as shown in FIGURE 2, so that the coils 8 of the stator assembly 7 identify the six phases of the electrical stepping motor. In practice more than two pairs of poles are provided on the stator assemblies 7 and the rotor 3, but two pairs of poles only are shown in FIGURE 2 for convenience of diagrammatic illustration.

The action of the electrical stepping motor is caused by the magnetic attraction between the poles 7a of the stator assemblies 7 and the rotor poles 4. Three of the coils 8 representing the phases of the electrical stepping motor are always energised simultaneously. If the phases $\bar{C}$, A and $\bar{B}$ are energised together, the rotor 3 will assume a position with its poles 4 aligned with the poles of stator A as shown in FIGURE 2. De-energising phase $\bar{C}$ and simultaneously energising phase C causes the rotor 3 to rotate in a clockwise direction so that its poles 4 will align with the poles of stator $\bar{B}$. It will thus be seen that, in order to rotate the motor in a clockwise direction, the necessary sequence in the energisation of the coils 8 is:

$$\bar{C}A\bar{B}, A\bar{B}C, \bar{B}C\bar{A}, C\bar{A}B, \bar{A}B\bar{C}, B\bar{C}A, \bar{C}A\bar{B}$$

In order to drive the motor in a counterclockwise direction the coils 8 are energised in the sequence:

$$\bar{C}A\bar{B}, B\bar{C}A, \bar{A}B\bar{C}, C\bar{A}B, \bar{B}C\bar{A}, A\bar{B}C, \bar{C}A\bar{B}$$

The operation of the motor relies on a drive unit which is the translator circuit and which converts the input command information into the output sequence for energising the six phases of the electrical stepping motor.

Figure 3:
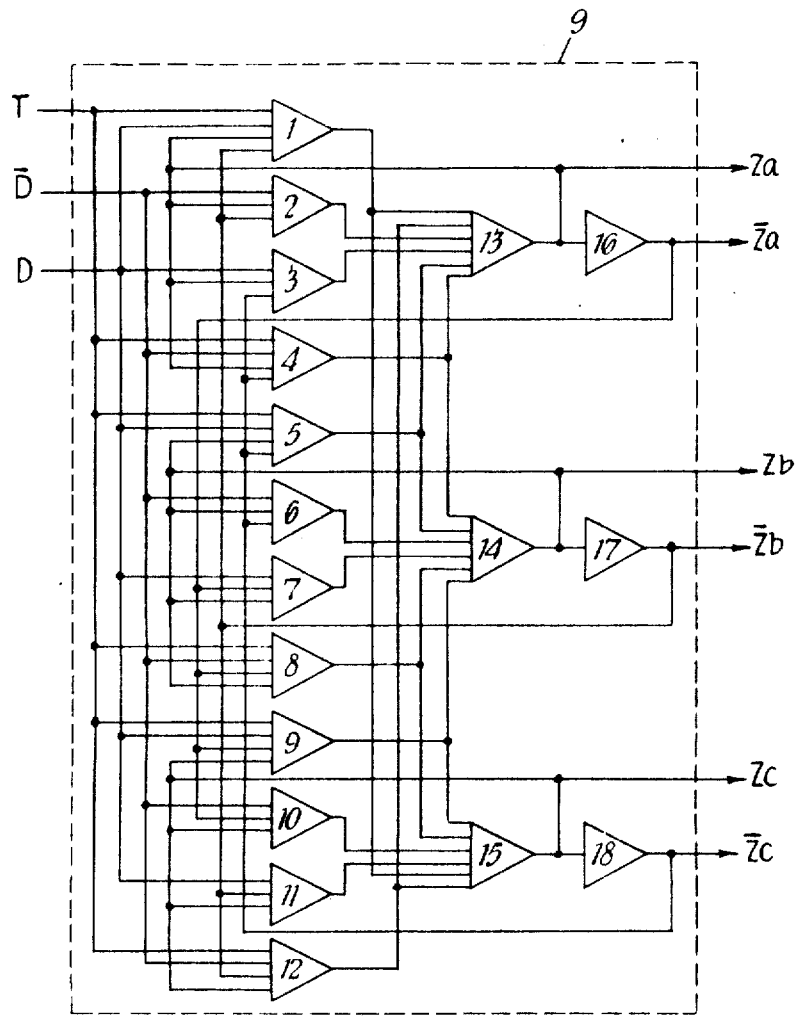
FIGURE 3 shows a translator circuit using NAND logic elements which may be used for driving the six phase electrical stepping motor of FIGURES 1 and 2.
Figure 4:
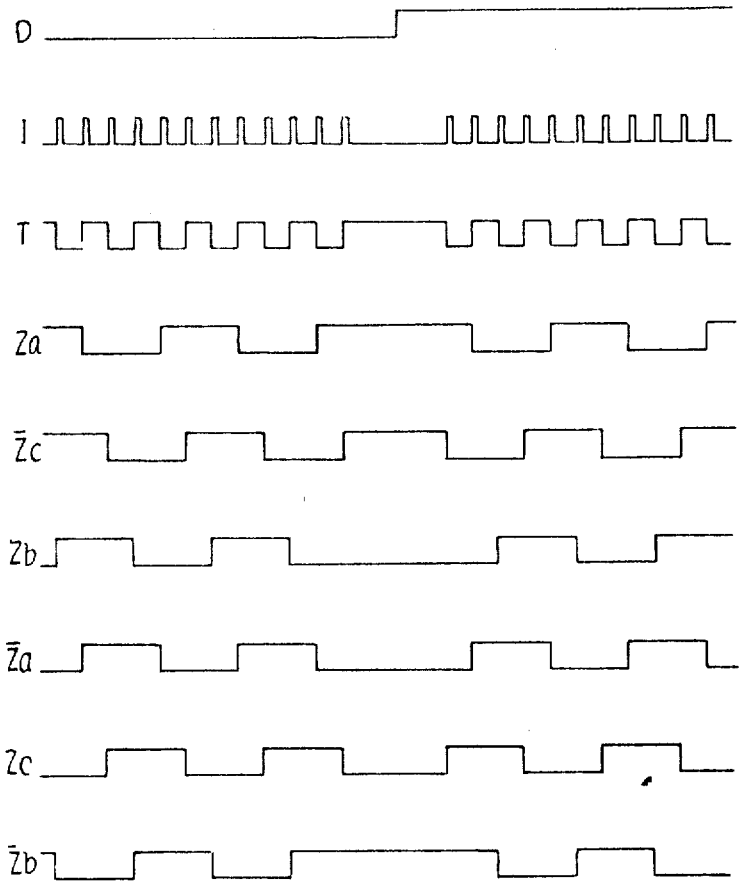
FIGURE 4 is a timing chart showing the electrical control signals, the input signals to the translator circuit and the output signals which are obtained from the translator circuit and used to drive the six phases of the electrical stepping motor.

FIGURE 3 illustrates one translator circuit 9 which may be used to drive the motor 1 and which has the facility that the sequence of energisation of its outputs may be without loss of angular reference. The input command information consists of two signals I and D, the form of which is shown in FIGURE 4. I is an input signal consisting of a series of pulses each of which represents a step of desired output displacement, while D is a direction control signal which determines the sequence in which the phases are energised and therefore controls the direction of the output displacement which is the direction of rotation of the output shaft. In the specification a bar over an input or output variable always signifies an inversion, so that, for example, a signal $\bar{D}$ is the complement of the signal D. Both the signals D and $\bar{D}$ are applied to the translator circuit 9 of FIGURE 3 together with a signal T.

The translator circuit 9 of FIGURE 3 is a translator circuit constructed from eighteen NAND logic elements and designed to give three outputs $Z_a$, $Z_b$, $Z_c$, which are produced in pairs with an intermediate state in which only one output is produced. The outputs will be present in the sequence $$Z_bZ_a, Z_a, Z_aZ_c, Z_c, Z_cZ_b, Z_b, Z_bZ_a$$

for one condition of the direction control signal D and in the sequence $$Z_bZ_a, Z_b, Z_cZ_b, Z_c, Z_aZ_c, Z_a, Z_bZ_a$$

for the other condition of the direction control signal. In fact the condition of the translator circuit 9 of FIGURE 3 in which only one output is produced is a transition stage between the two states, for example $Z_bZ_a$, $Z_aZ_c$, which are stages determined by successive pulses of the input signal I. The translator circuit of FIGURE 3 is therefore essentially a three phase translator circuit designed for the 2, (1), 2, (1), 2 sequence of energisation of a three phase electrical stepping motor.

However, also present in the circuit of FIGURE 3 are the inversions or complements $\overline{Z}_a$, $\overline{Z}_b$, $\overline{Z}_c$, of the output signals $Z_a$, $Z_b$, $Z_c$, and in accordance with the present invention the six outputs $Z_a$, $\overline{Z}_a$, $Z_b$, $\overline{Z}_b$, $Z_c$, $\overline{Z}_c$, are used, after suitable amplification, to drive the six phases of the electrical stepping motor 1. The output $Z_a$ is connected to the coil 8 denoted as phase A of the motor, the output $\overline{Z}_a$ to the coil 8 denoted as phase $\overline{A}$ of the motor, and so on.

In order to adapt the particular three phase translator circuit 9 of FIGURE 3 to drive the six phase electrical stepping motor 1, it is necessary to derive from the input signal I an intermediate signal T (see FIGURE 4) having a frequency equal to half the frequency of the input signal. The derivation of a new drive signal is necessary, because the three phase translator circuit 9 of FIGURE 3 is constructed so that the duration of the pulse in the signal I controls the time for which a single phase of a three phase electrical stepping motor is energised. The circuit 9 may have the sequence of energisation of its outputs reversed without loss of angular reference.

Figure 5:
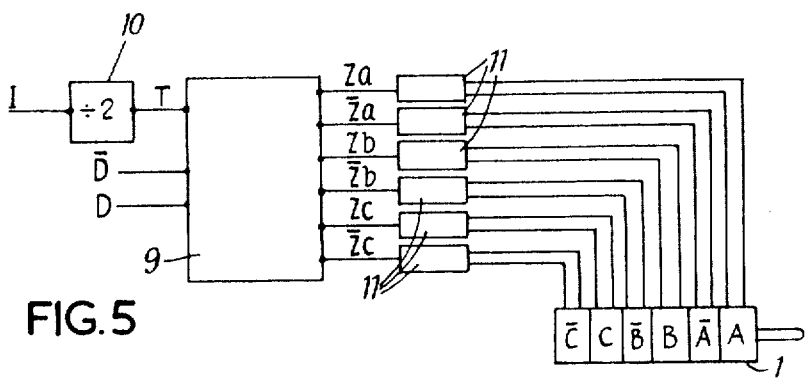
FIGURE 5 is a schematic figure showing a system in accordance with the present invention for converting electrical control signals in digital form into discrete stepped angular motion using the translator circuit of FIGURE 3 in conjunction with a six phase electrical stepping motor of FIGURES 1 and 2, the arrangement operating in accordance with the timing chart of FIGURE 4.

Referring now to FIGURE 5, there is shown in block diagram form a complete system in accordance with the present invention incorporating the translator circuit 9 of FIGURE 3. The input signal I is applied direct to a binary trigger circuit 10 which is a simple scale of two counter in which the output changes state on the rising or leading edge of every input pulse in the signal I. The binary trigger circuit 10 thus effectively divides the input signal I by two to produce the signal T which is applied to the three phase translator circuit 9 at the position indicated by T in FIGURE 3.

Also applied to the three phase translator circuit 9 are the signals D and $\overline{D}$. The outputs $Z_a$, $Z_b$ and $Z_c$ together with their complements $\overline{Z}_a$, $\overline{Z}_b$, and $\overline{Z}_c$ are taken from the translator circuit 9 and, after amplification in current amplifiers 11, are applied to the corresponding phases of the six phase motor 1.

Referring again to the timing chart which is FIGURE 4, the duration of the outputs, and consequently the durations of the complements of the outputs, are shown, the sequence of operation which controls the direction of rotation of the output shaft 2 of the motor 1 being indicated on the left hand side of the timing chart for one condition of the displacement signal D, while the sequence of energisation of the outputs for the other condition of the direction control signal D is shown on the right hand side of the timing chart of FIGURE 4. It will be observed that at all times three phases of the electrical stepping motor 1 are energised, and this follows automatically from the fact that three of the energising signals are complements of the other three signals.

Figure 6:
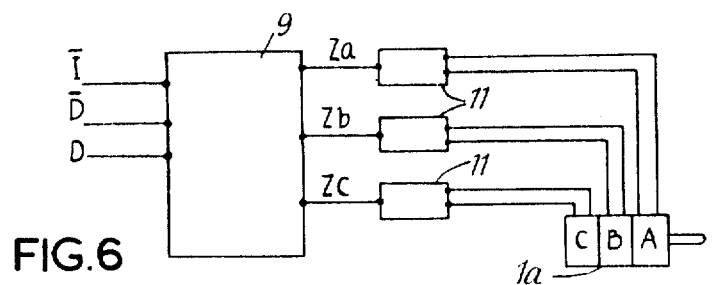
FIGURE 6 shows schematically a system for converting electrical control signals in digital form into discrete stepped angular motion using a three phase electrical stepping motor and the translator circuit of FIGURE 3.

For the purposes of comparison there is shown in FIGURE 6 an exactly comparable system for driving a three phase electrical stepping motor 1a. The additional circuitry which has been provided in order to drive the six phase electrical stepping motor 1 according to this embodiment of the invention consists solely of the binary trigger circuit 10 and three additional current amplifiers 11.

Figure 7:
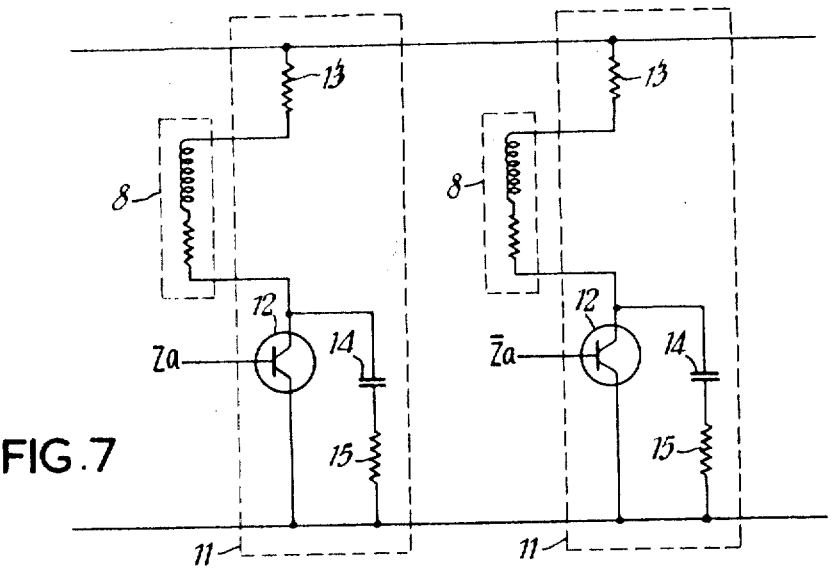
FIGURE 7 shows the circuit element of the known current amplifier indicated in block diagram form in FIGURES 5 and 6.

Two of the current amplifiers 11, which are conventional, are shown in FIGURE 7. The signal Z from the translator circuit 9 is applied to the base of a transistor 12 which is connected in series with the coil 8 of the particular phase of the electrical stepping motor 1, the inductance and resistance of the coil 8 being denoted separately in FIGURE 7. Also connected in series with the transistor 12 and the coil 8 is a forcing resistor 13 which may, for example, have a resistance ten times the resistance of the coil 8. Capacitor 14 and resistor 15 are connected in parallel with the transistor 12 in order to limit the induced voltage which occurs across the transistor 12 at switch-off, so that damage to the transistor 12 is prevented.

The forcing resistor 13 is included in order to reduce the time constant of the circuit which is determined by the inductance and resistance of the coil 8, so that the current through the coil 8 reaches the maximum value in as short a time as possible. The forcing resistor 13 is therefore an essential component of the current amplifier indicated in FIGURE 7. In the system of FIGURE 5 there is a forcing resistor 13 for each phase of the electrical stepping motor 1, and this is believed to have been the practice in all electrical stepping motor systems previously known.

Figure 8:
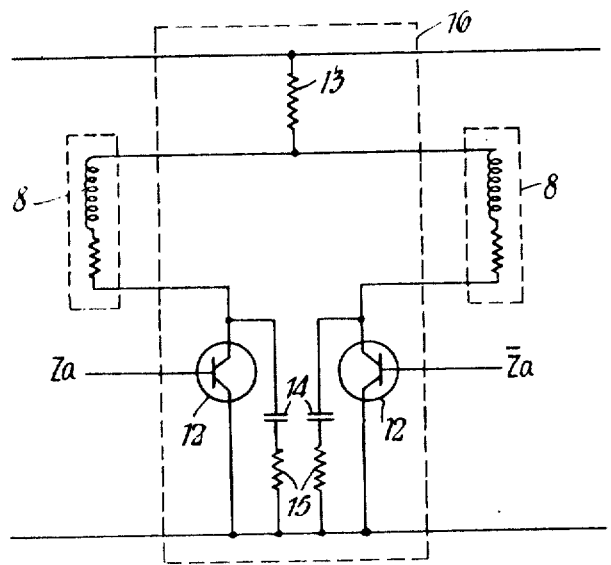
FIGURE 8 shows a double current amplifier in accordance with a feature of the present invention which may be used to replace a pair of current amplifiers shown in FIGURE 5.

In accordance with a further feature of the present invention a saving in the cost of the system of FIGURE 5 may be effected by substituting for two current amplifiers 11 a double current amplifier 16 which is illustrated in FIGURE 8. Because, in the system according to the invention using a six phase electrical stepping motor 1 where the outputs and the complements of the outputs are used to drive two phases, the pair of drive signals which comprises each output and its complement are never both present together, the number of forcing resistors 13, which are comparatively costly and bulky items of the electrical circuitry, may be reduced. In the double current amplifier 16 the transistors 12 which amplify the output signals $Z_a$ and its complement $\overline{Z}_a$ are connected in a parallel circuit which also includes their respective coils 8. A single forcing resistor 13 is connected in series with the parallel circuit comprised by a transistor 12 and a coil 8 in each arm.

In the embodiment of the invention which has been described and which includes the three phase translator circuit 9 of FIGURE 3 a signal T having a frequency different from the input signal I had to be derived. However, by using a three phase translator circuit which is constructed for driving an electrical stepping motor in which the sequence of phase energisation is 2, 1, 2, 1, 2, the translator circuit may be used without the addition of any further elements and the step of deriving the signal T may be avoided. The command signals I and D of FIGURE 4 are fed direct to such a translator circuit, together with $\overline{D}$, and the six outputs are amplified and connected to the six phases of the motor. Such a translator circuit may be based on binary trigger elements (for example J–K flipflops) arranged as a three stage twisted ring counter, with additional logic gates to provide reversal of the sequence in which the phases are energised in a manner which avoids loss of angular reference.

The basic three translator circuit which is herein described as part of the system for driving a six phase electrical stepping motor employs eighteen logic elements. The actual number of logic elements employed will depend on the kind of logic element selected for the circuit, and another three phase translator circuit may employ, for example, twenty-four logic elements. In the known translator circuits for driving a five phase electrical stepping motor, the logic elements selected were those of which twenty-four were required in a three phase translator circuit. When the five phase electrical stepping motor was arranged to be driven with three phases always energised in the rest position, thirty-six of these logic elements were required for the translator circuit and, when the five phase electrical stepping motor was designed so that two and three phases were energised alternatively, no less than fifty-two logic elements were required. Accordingly the comparative simplicity in the design of a system for increasing the speed of operation of an electrical stepping motor system in accordance with the present invention will be understood.

Each phase of the six phase electrical stepping motor is energised for a longer time than the phase of a three phase electrical stepping motor is energised. Consequently the current through each phase of the motor has a longer time to establish itself and a more effective torque is applied to the rotor.

Because three phases of the six phase electrical stepping motor are energised to control the movement of the rotor in the invention which has been described and illustrated herein, the torque which is developed is twice the torque which is developed in the known three phase electrical stepping motor. The system as described is therefore able to operate at a higher frequency for two reasons, firstly the greater torque which is applied to the rotor of the stepping motor, and, secondly, the use of a greater number of phases in the stepping motor than has been proposed hitherto.

It has been found that a system in accordance with the present invention and using a six phase electrical stepping motor is capable of operation at a speed of 12,000 steps per second, whereas the known five phase systems have a maximum speed of the order of 8,000 steps per second for an equivalent output torque.

I claim:
1. A system for converting electrical control signals in digital form into discrete stepped angular motion comprising a six phase electrical stepping motor, a translator circuit having three outputs, and means connecting the three outputs and the complements of the three outputs of the translator circuit to the six phases of the electrical stepping motor to drive the six phases of the electrical stepping motor under the control of the control signals which comprise a series of input pulses, each representing one step of desired angular motion, and a directional control signal for controlling the sequence in which the phases of the electrical stepping motor are energized.

2. A system according to claim 1, wherein the translator circuit is a three phase translator circuit capable of driving a three phase electrical stepping motor in an energising sequence denoted as a 2, (1), 2, (1), 2 mode of operation, and wherein a binary trigger circuit is connected in the path of the series of input pulses to the translator circuit for deriving from the series of input pulses a second series of pulses having a frequency equal to half the frequency of the series of input pulses.

3. A system according to claim 2, wherein amplifier means are provided for each output and each complement, and wherein a single forcing resistor is shared by the amplifier means amplifying an output and by the amplifier means amplifying the complement of that output.

4. A system for converting electrical control signals in digital form into discrete stepped angular motion comprising a translator circuit capable of giving three outputs, a six phase electrical stepping motor, means including current amplifiers for connecting the three outputs of the translator circuit to three of the phases of the electrical stepping motor and for connecting the complements of the three outputs of the translator circuit to the remaining three phases of the electrical stepping motor, means for feeding to the translator circuit a series of pulses each of which is related to one step of desired angular motion, and means for feeding to the translator circuit a directional control signal, the translator circuit thereby energising three angularly adjacent phases of the electrical stepping motor in any one operating condition of the translator circuit, a receipt of a pulse by the translator circuit causing the said circuit to change its operating condition by inverting one output so that a phase angularly succeeding one end phase of the three energised phases becomes deenergised and simultaneously a phase which was the phase at the opposite end of the three energised phase becomes energised so that a new series of three angularly adjacent phases is energised, and the end of the three energised phases at which energisation of the next phase occurs being selected by the directional control signal.

5. A system according to claim 4, wherein the translator circuit is a three phase translator circuit capable of driving a three phase electrical stepping motor in an energising sequence denoted as a 2, (1), 2 (1), 2 mode of operation, and wherein a binary trigger circuit connected in the path of the series of input pulses to the translator circuit for driving from the series of input pulses a second series of pulses having a frequnecy equal to half the frequency of the series of input pulses.

6. A system according to claim 5, wherein amplifier means are provided for each output and each complement, and wherein a single forcing resistor is shared by the amplifier means amplifying an output and by the amplifier means amplifying the complement of that output.

7. A system according to claim 6, wherein the amplifier means include transistors to the bases of which the signal to be amplified is applied, each transistor being connected in series with a corresponding coil of the six phase electrical stepping motor, the transistors and coils to which an output and the complement of that output are applied being connected in the opposite arms of a parallel circuit, and each parallel circuit being connected in series with a single forcing resistor.

References Cited

UNITED STATES PATENTS

| | | | |
|---|---|---|---|
| 3,355,646 | 11/1967 | Goto | 318—138 |
| 3,356,920 | 12/1967 | Button | 318—138 |
| 3,391,318 | 7/1968 | Hirokawa | 318—112 |
| 3,414,785 | 12/1968 | Orahood et al. | 318—18 |

WARREN E. RAY, Primary Examiner

U.S. Cl. X.R.

310—49